Patented Nov. 29, 1938

2,138,734

UNITED STATES PATENT OFFICE 2,138,734

COMPOSITE SURFACING MATERIAL

Albert Ernest Horatio Dussek, Bromley, England

No Drawing. Application October 10, 1936, Serial No. 105,148. In Great Britain November 8, 1935

2 Claims. (Cl. 106—31)

This invention relates to composite surfacing materials particularly, though not exclusively, for surfacing roads, and of the kind comprising rubber, a bituminous substance and pulverized or broken up mineral matter.

In mixtures of the above type as hitherto proposed the rubber employed has been treated so that it will be dissolved or melted and hence it has lost its identity in the ultimate composition.

A composite surfacing material according to the present invention comprises a species of bitumen, such as Trinidad asphalt, an "aggregate" and ground or broken waste vulcanized rubber containing a filler or fillers, the rubber being insoluble in the bitumen so that the rubber will retain its identity when the composite mass is raised to the temperature necessary for mixing and subsequent spreading.

In the finished state therefore the particles or pieces of rubber in the composite mass retain their identity as such so that, since the rubber in the form employed has a high melting point, the tendency for the composite mass to soften, wave or bleed at high atmospheric temperatures, which is liable to occur with compositions comprising rubber dissolved in a bituminous substance, is overcome.

The waste rubber employed is preferably what is known as pneumatic tyre or bus-tyre waste comprising either the tyre cover or tube or solid rubber tyre which has been vulcanized and contains a filler or fillers introduced during the manufacture of the tyre. The presence of the filler renders the rubber suitable for use in the manufacture of the surfacing material according to the invention partly by reason of the fact that the filler raises the melting point of the rubber appreciably above that of bitumen. Thus, by utilizing rubber in the form indicated above, a surfacing material having a high degree of resilience and also a melting point well above maximum atmospheric temperatures is obtained by merely grinding or breaking up the rubber and mixing it with the bitumen and aggregate, without any preliminary treatment of the rubber to render it insoluble in the bitumen or to raise its melting point above maximum atmospheric temperatures.

The species of bitumen employed may be Trinidad asphalt or petroleum asphalt having a "penetration figure" between 40 and 50. The "penetration figure" is a coefficient of hardness of the bitumen at a given temperature. The term "aggregate" is employed throughout this specification in the same sense as it is usually employed in reference to the composition of concrete, e. g. granite or other stone, gravel (wholly or partially broken up to reduce the number of rounded particles or stones) or clinker, with or without sand and/or a suitable filler, such, for example, as cement or slate dust.

A composite surfacing material according to the invention may comprise from 70% to 86% by volume of aggregate, from 9% to 15% by volume of bitumen, and from 5% to 15% by volume of ground or broken vulcanized pneumatic tyre or bus-tyre waste rubber which, as above indicated, contains one or more fillers and will not be dissolved by the bitumen when the composite mass is raised to that temperature which may be necessary for mixing and subsequent spreading. For example, 75% by volume of the composite material may consist of aggregate, say, broken granite ranging in size from one inch to three-sixteenths of an inch, the balance consisting, approximately, as to one half of the waste vulcanized rubber ground so that the particles will pass a sieve of approximately 16 to 18 mesh, and the other half of bitumen. Hence, in this composition, which is particularly suitable when the aggregate comprises broken granite, there will be 12½% of rubber and 12½% of bitumen. Another satisfactory composition where broken granite is used as aggregate consists of 80% aggregate, 10% of the waste rubber and 10% bitumen.

If gravel is employed as the aggregate it is preferably broken or ground to reduce the content of rounded stones. If the aggregate is partly or wholly constituted by clinker this should be of the type usually referred to as "hard-burnt clinker". Since clinker provides an aggregate which is somewhat softer than either the gravel or granite aggregates above referred to, the proportions of the ingredients in the composite mass are conveniently somewhat modified. Thus, when employing a clinker aggregate the latter may constitute, say, 70% by volume of the composite mass, the remainder being constituted by 15% of the waste rubber and 15% of bitumen.

The aggregate may be constituted by one or more relatively coarse materials together with a suitable filler. Thus, for example, the aggregate may comprise broken granite ranging in size between one inch and three-sixteenths of an inch and constituting 50% of the composite mass, sand constituting 12½% of the composite mass and cement or slate dust constituting 12½% of the composite mass. The aggregate thus constitutes 75% of the composite mass whilst the rubber and bitumen contents each constitute 12½%.

In some instances the quantity of aggregate may be increased and the quantity of rubber and bitumen reduced. Thus, for example, the aggregate may comprise broken granite ranging in size between ¾ of an inch and ¼ of an inch and constituting approximately 61% of the composite mass and sand constituting, say, 25% of the composite mass. The aggregate thus constitutes approximately 86% of the composite mass, whilst the rubber constitutes 5% and the bitumen 9%, approximately, of the composite mass.

The mixing of the ingredients may be carried out in what is usually referred to as a "hot asphalt" plant, such as that commonly employed for mixing asphalt macadam. The mixing may thus be effected at the roadside so that the hot mixture can be taken from the machine, spread on the road surface and rolled. Preferably the aggregate is heated and the bitumin then added and mixed with the aggregate, the period of heating varying, for example, to suit atmospheric conditions and moisture content of the aggregate. The ground or broken rubber is then added and mixed with the bitumen and aggregate, at a temperature in the region of 150° C., say between 150° C. and 160° C., this mixing process being continued only for the short time, say from a half minute to one minute, necessary to ensure satisfactory mixing of these materials. The composite mass is then spread as required to form the road surface.

Since the rubber is heated in the mixing plant only for a brief period, i. e. a half minute to one minute, and, moreover, the maximum temperature to which the rubber is subjected during this short period does not appreciably exceed 150° C., the rubber will not be melted or disintegrated but will retain its identity as such and will remain in the condition in which it was added. It will be appreciated that the duration of the mixing period after the rubber has been added will vary with conditions, e. g. the quantities and proportions of the ingredients and the size of the particles to be mixed, and that the maximum temperature to which the rubber is subjected may also vary provided that this will not be sufficiently high to melt the rubber or soften it to a degree which will cause it to disintegrate during or after the mixing process.

The surface on which the mixture is laid may be prepared in the usual way, that is to say, by scarifying and levelling, the layer of the mixture applied being, say, 2 inches to 2½ inches in thickness. In this respect it should be noted that the surfacing material according to the invention provides the permanent road surface and is not intended to constitute a superficial dressing applied to an existing road surface.

The surfacing material may be finished by merely rolling it without any final dressing or it may be dressed with a bitumen-water emulsion, or hot bitumen and powdered rubber may be rolled in. If desired, with a view, for example, to providing a rough or non-skid surface, the surfacing material according to the invention, after being laid, may be roughened by rolling into it, while it is hot, stone chips with or without precoating of the latter, or powdered rubber alone may be rolled into the surface while this is still sufficiently plastic to permit penetration of the rubber particles.

The surfacing material according to the invention may be laid on any suitable base. Thus, for example, when the base is constituted by concrete the layer of the composite material which is applied may be somewhat less than 2½ inches. It will, however, be appreciated that the thickness of the layer of composite surfacing material which is applied will necessarily be largely governed by the traffic conditions to which the road is to be subjected. A layer of approximately 2½ inches of the composite material laid on a base which is to withstand heavy motor traffic should, however, be sufficient.

While the composite surfacing material according to the invention is primarily intended for use on road surfaces it may be employed, for example, for surfacing floors or roofings of buildings. When employed as a road surface the composite material will not tend to wave or bleed, work up or creep when subjected to traffic conditions, assuming that it is laid on a base which is itself sufficiently firm to withstand the traffic conditions to which the road is subjected. Since the waste rubber employed will not be dissolved when the composite mass is raised to the temperature necessary for mixing and subsequent spreading, the rubber will retain its identity as such and the finished surfacing material will thus be constituted by a mass of bitumen reinforced and hardened by the aggregate and containing particles or pieces of undissolved rubber. While imparting a desirable resilience to the finished surface, the rubber will not itself melt or soften at high atmospheric temperatures, whilst the rubber and the aggregate together provide a durable wearing surface which can be readily repaired. The identity of the rubber will be retained to such a degree that by scraping or picking the surface of the composite material small particles or pieces of rubber may be extracted as such, the elasticity of these particles or pieces being substantially unimpaired.

The invention is further advantageous in that it makes use of rubber in a state which renders it unsuitable for reworking up, that is to say rubber which can be regarded in the true sense as waste. Thus, while rubber which has not been worked up and contains no filler is soluble in bitumen and would therefore have to be subjected to preliminary treatment in order to render it suitable as an ingredient for a surfacing material conforming with the invention, the waste rubber employed need not be subjected to any preliminary treatment other than grinding or breaking up so that the cost of production is reduced on the one hand by utilizing waste rubber which has otherwise served its purpose, and on the other hand by simplifying the process of production.

It will be understood that the compositions above indicated are given by way of example only and may be varied to suit requirements.

What I claim as my invention and desire to secure by Letters Patent is:—

1. The method of preparing a composite surfacing material which consists in the steps of mixing 70% to 86% by volume of aggregate with 9% to 15% by volume of an asphaltic species of bitumen and from 5% to 15% by volume of ground or broken waste vulcanized rubber containing at least one filler, and heating the mixture at a temperature above the melting point of the bitumen but below that of the rubber and for a period sufficient to insure intimate mixing of the three ingredients but insufficient to cause the rubber to melt or disintegrate whereby the rubber particles retain their identity as such.

2. The method of preparing a composite surfacing material which consists in the steps of mixing 70% to 86% by volume of aggregate with 9% to 15% by volume of bitumen, having a "penetration figure" between 40 and 50, under temperature conditions necessary to melt the bitumen, thereupon adding to the mixture 5% to 15% by volume of ground or broken waste vulcanized rubber containing at least one filler, and mixing the bitumen, aggregate and rubber at a temperature below the melting point of the rubber and for a time period sufficient to obtain intimate mixing of the three ingredients but insufficient to cause the rubber to melt or disintegrate whereby the rubber particles retain their identity as such.

ALBERT ERNEST HORATIO DUSSEK.